United States Patent Office 2,922,724
Patented Jan. 26, 1960

2,922,724

METHOD OF PRODUCING IRIDESCENCE

Leon M. Greenstein, New York, William G. Young, Lake Mohegan, and Charles A. Quinn, Peekskill, N.Y., assignors to Francis Earle Laboratories, Inc., Peekskill, N.Y., a corporation of New York No Drawing. Application July 1, 1957
Serial No. 669,384

17 Claims. (Cl. 117—82)

This invention relates to methods for producing iridescent coatings. More particularly, it relates to the production of an iridescent coating by means of an interference film deposited on a layer of lamellae of relatively high index of refraction.

Although there are many possible uses for iridescent coatings in the decoration of costume jewelry, plastic objects, glass and metal surfaces, etc., methods for producing such films have been cumbersome and expensive, thus greatly limiting their application. One current method for producing iridescence consists of a series of polishing and dipping operations. It is an advantage of the present invention that all operations are liquid coating operations, avoiding the costly polishing steps.

Accordingly this invention involves a process for producing iridescence by depositing a layer of lamellae of high index of refraction on an object by a liquid coating method, such as dipping, spraying, roller coating, knife coating and printing, and subsequently depositing an interference film of plastic or resin on top of the lamellae, also by such methods.

Iridescence refers to a rainbow-like play of colors, such as is seen in the soap bubble, mother-of-pearl, etc. One method of achieving this effect utilizes the principle of interference of light rays, which results in a neutralization or loss of certain wave lengths of the original white light with the consequence that a color is produced by the combination of the residual wave lengths. The particular color which is removed by interference is dependent upon the thickness of the film and its refractive index. It is well known that interference colors can appear only in extremely thin films which are of a thickness of the order of one-fourth the wave length of light and which are at least partially transparent. Interference occurs when the ray reflected from one surface of a film is one-half wave length out of phase with the ray reflected from the other surface.

The condition for interference generally involves films of the order of one-fourth the wave length of light, since the ray reflected from the inner interface traverses the film twice. However, the index of refraction of the film also enters into this consideration, since the wave length of a ray within the film is actually $\lambda/N$, where N is the index of refraction of the film for light whose wave length is $\lambda$ in the air. The criterion for interference is therefore a film of the order of $\lambda/4N$ in thickness. Interference also occurs for film thicknesses which are small odd-numbered multiples of $\lambda/4N$, such as $3\lambda/4N$ and $5\lambda/4N$. This thickness, $t$, can be expressed in general terms by the expression $t=(2n+1)\lambda/4N$, where $n$ is zero or an integer. For interference to appear, $n$ must be small, usually not greater than 5, because at large values of $n$, many different combinations of $n$ and $\lambda$ satisfy the equation and the resulting color therefore approaches white.

Since white light consists of a mixture of rays with wave lengths varying from about 400 millimicrons to about 750 millimicrons, the film thickness which causes a ray of given wave length to lag just half a wave length behind the incident ray will cause the interference of that ray only, and thus will eliminate one color, allowing the reflected light to have the color which is made up of the combination of all the residual wave lengths.

The index of refraction determines not only the thickness of the film necessary to give interference at a particular wave length, but also the amount of light reflected. The higher the index of the film the greater the proportion of incident radiation which is reflected, and the greater the possibilities for intense iridescence.

If the thin film in question were perfectly uniform in thickness, the same wave length of light would be eliminated from any part of the film. Since, however, the film is not quite uniform, the thickness at one point will cause the elimination of one color, and at another point, of a different color. The residual colors in the reflected light, therefore, differ from one part of the film to another, and produce a rainbow-like play of colors.

Iridescent films are highly desirable in the simulated pearl industry. Natural pearls show a play of colors from a diffraction effect, as well as a luster which is independent of color. Simulated pearls, such as are commonly prepared from pearl essence and other nacreous pigments, reproduce a luster like that of the natural pearl, but do not achieve this play of colors, or iridescence.

To achieve iridescence on simulated pearls, one widely used method utilizes the interference produced by a very thin film of nitrocellulose. Since simulated pearl finishes themselves consist of pearl essence in nitrocellulose, it is necessary to separate the critical thin film from the main coating of the object. This is accomplished by first coating the uncolored simulated pearl with cellulose acetate, polishing the latter with a substance of high index of refraction, like bismuth oxychloride, and finally topping the latter with the thin, interference-producing film. Because the latter film is easily damaged, it is advisable to protect it further with a more resistant coat or coats. This part of the procedure generally involves an additional polish with bismuth oxychloride, followed by deposition of a water-soluble film-former, like methyl cellulose or gelatin, and is finally completed with a protective coat of clear nitrocellulose. The second polish with bismuth oxychloride is necessary in order to maintain a reflection interface, since the deposition of one film-former of index of refraction of approximately 1.5 on another of similar index or refraction would otherwise be optically homogeneous. The intervening layer of water-soluble film-former is desired as a cushion between the two nitrocellulose films; in its absence, the solvents from which the outer nitrocellulose coating is applied would attack the thin nitrocellulose film thus damaging the critical interface.

Techniques of this type are commonly applied to objects of glass, metal or plastic to produce an iridescent effect. Such procedures are extremely costly, primarily because the objects to be coated cannot be handled as readily for the polishing operations as for dippings. For example, entire strings of simulated pearls can be dipped at one time, but the pearls must be handled individually in order to be polished properly.

In accordance with the present invention, iridescence is achieved by depositing a film of plastic or resin of approximately one-quarter wave length thickness over (a) a layer of transparent or translucent lamellae of high index of refraction, i.e. of 1.80 or higher, or over (b) a layer of metallic or other opaque lamellae (where index of refraction is not pertinent). The layer of lamellae is deposited from a suspension of the lamellae in a volatile liquid, and thus can be applied by a dipping, spraying or other liquid coating techniques. The lamellae are quite small and, depending on the type of material used, would generally be between about 1–50 microns in diameter and in the range of 10–250 millimicrons in thickness.

The high index or opaque layer has the purpose of optically separating the quarter wave length film from the surface which is being treated. Ordinary glass, for example, has an index of refraction of approximately 1.52. Nitrocellulose, a convenient material for the quarter wave length film, has an index of approximately 1.50. These indices are so similar that ordinarily virtually no reflection would occur at the interface between them. The interface becomes reflective, however, if the glass and nitrocellulose are separated by a thin film of an index above about 1.80.

A critical feature in producing iridescence by the present method is in the application of the high index layer. It is desirable that this layer be as smooth as possible, which can be achieved only if the lamellae have smooth surfaces and are extremely well-dispersed in the liquid from which they are applied. Thin lamellae have a tendency to adhere to one another to form agglomerates, and must, therefore, be suspended in those solvents which wet their surfaces most effectively in order that the lamellae remain individually dispersed.

A suitable lamellar substance is basic lead carbonate (indices of refraction 2.09, 1.94). This compound forms extremely thin hexagonal crystalline plates which are very well dispersed in such solvents as methyl ethyl ketone and the monomethyl ether of ethylene glycol. To produce iridescence on a glass surface, the glass is dipped in a suspension of basic lead carbonate crystals in one of these solvents. The crystals easily adhere to the glass after the solvent has evaporated, forming an essentially continuous layer. The glass object is then dipped into a dilute nitrocellulose lacquer which forms a quarter wave length film on evaporation of the solvent, producing iridescent colors. The thickness of the dried film depends on the solids content of the lacquer and its viscosity.

Other high index lamellae which are suitable are flakes of glass of high index of refraction (above 1.80), lead hydrogen phosphate (1.86, 1.83, 1.81), natural pearl essence crystals (1.85, 1.8, 1.46), lead hydrogen arsenate (1.97, 1.90), molybdenum oxide (>2.0), graphite, metallic aluminum, molybdenum disulfide (>2.0). All but the latter three are colorless and transparent. Aluminum, graphite (black) and molybdenum sulfide (deep blue) are relatively opaque. The overall appearance of the iridescence can be modified by the use of these substances.

The quarter wave length film can be produced not only by nitrocellulose but any substance capable of forming a thin, transparent, smooth and continuous film. Other suitable film-formers are ethyl cellulose, cellulose acetate, methyl cellulose, carboxymethyl cellulose, polyvinyl alcohol, gelatin, acrylate esters, alkyd resins, polyvinyl chloride and polyvinyl acetate and their copolymers, alginates, polyester resins, epoxy resins, silicates and silicones. The film-former is deposited from a suitable solvent in which it is initially present in small concentrations generally not exceeding five percent.

In applying the iridescent film herein contemplated it is important that the film-former does not contain any material which is a solvent for or would otherwise attack the lamellar coating to which it is applied. Thus, where the lamellae have been deposited on nitrocellulose, it is important that the film-former for the iridescent film be applied from solution in a solvent which is a non-solvent for nitrocellulose. This will be apparent from the specific examples which follow. Where the interference film must be deposited from a solvent which is capable of attacking the layer to which the lamellar coating has been applied, an intermediate protective coating which is not so attacked must first be applied. Thus, when the lamellar coating is deposited on nitrocellulose and iridescence is to be produced with a nitrocellulose film, an intermediate coating which is not soluble in nitrocellulose solvents is used. Examples of such coatings would include methyl cellulose or gelatin applied from water solution.

The use of some of these materials is illustrated in the following examples:

Example I

A glass object is made iridescent by being dipped into a 10.0 percent dispersion of lead hydrogen phosphate crystals (average diameter $8\mu$, thickness approximately 100 m$\mu$) in the monomethyl ether of ethylene glycol. After evaporation of the solvent, the object is dipped into a dilute nitrocellulose lacquer with the following composition:

| | Percent |
|---|---|
| Nitrocellulose, 15–20 sec. | 2.9 |
| Ethanol | 1.2 |
| Butyl propionate | 5.1 |
| n-Amyl acetate | 13.8 |
| n-Butyl acetate | 77.0 |

On drying, the glass has taken on a beautiful rainbow appearance. The procedure is applicable to transparent colorless glass as well as opaque or colored glasses.

Example II

A polyester pearl button is dipped into a 6.5 percent dispersion of natural pearl essence crystals (average length $20\mu$, thickness approximately 50 m$\mu$) in ethylene dichloride. When the solvent has evaporated, the button is dipped into a dilute alkyd varnish of the following composition:

| | Percent |
|---|---|
| Alkyd drying resin solids | 3.2 |
| Xylol | 96.8 |

The alkyd resin film is cured by baking after evaporation of the xylol, producing a permanent iridescence.

Example III

A simulated pearl, which consists of a glass or a plastic bead coated with a nacreous pigment in a nitrocellulose film, is made iridescent by coating with a 44% suspension of basic lead carbonate crystals (average diameter $20\mu$, thickness approximately 50 m$\mu$) in n-butanol. The dried bead is then dipped in the following methyl cellulose solution:

| | Percent |
|---|---|
| Methyl cellulose (15 cps.) | 2.87 |
| Water | 97.13 |

The dried bead is re-dipped in the butanol suspension of basic lead carbonate, and finally coated with a protective ethyl cellulose lacquer, as follows:

| | Percent |
|---|---|
| Ethyl cellulose | 10 |
| Toluol | 90 |

Example IV

A simulated pearl consisting of a glass or plastic bead coated with a nacreous pigment in a nitrocellulose film is dipped in a solution of 10% methyl cellulose (15 cps.) in water. The bead is coated with the lamellae of Example III. After evaporation of the solvent, the coated pearl is made iridescent by dipping it in the nitrocellulose lacquer of the composition set forth in Example I. In this case the methyl cellulose coating provides a protective barrier so that the solvents of the nitrocellulose lacquer which forms the iridescent layer do not attack the nitrocellulose film of the nacreous coating.

Example V

In an alternative method for applying iridescence to simulated pearls, beads coated with a nacreous pigment in cellulose acetate are dipped in a 25.0% suspension in isopropanol of glass lamellae approximately $50\mu$ in diameter and 100 m$\mu$ thick made by fracturing a blown lose coated nacreous bead a layer of a water soluble polymer which is not attached by nitrocellulose solvents, then applying a 1 to 60 percent dispersion of smooth-surfaced lamellae, having an index of refraction of at least 1.80, in a liquid thereby forming on said bead a smooth, continuous lamellar coating, and then applying directly to said lamellar coating a smooth, continuous film of nitrocellulose from a transparent lacquer, said nitrocellulose film being of a thickness of the order of $$(2n+1)\lambda/4N$$

where $\lambda$ is the wave length, in air, of the light transmitted through the film N is the index of refraction of the film and $n$ is zero or an integer not greater than 5.

10. The method of claim 9 in which the lamellae are basic lead carbonate crystals.

11. The method of claim 9 in which the coated bead is of a light-transmitting material from the group consisting of glass, polyester and acrylic resins.

12. The method of claim 9 in which the water-soluble polymer is from the group consisting of gelatin and methyl cellulose.

13. An iridescent article of manufacture comprising a base having a nacreous effect, and superimposed thereon a layer of smooth-surfaced lamellae, having an index of refraction of at least 1.80, said layer being of the order of one lamella thick and being in direct contact with a coating of a light-transmitting film of a thickness of the order of $$(2n+1)\lambda/4N$$

where $\lambda$ is the wave length, in air, of the light transmitted through the film, N is the index of refraction of the film and $n$ is zero or an integer not greater than 5.

14. An iridescent article of manufacture comprising a base of light-transmitting material from the group consisting of glass, polyester and acrylic resins, said base having a nacreous effect, and superimposed thereon a layer of smooth-surfaced lamellae from the group consisting of natural pearl essence, basic lead carbonate and glass having an index of refraction of at least 1.80 and of the order of one lamella thick, said lamellae being in direct contact with a coating of a light-transmitting film of a thickness of the order of $$(2n+1)\lambda/4N$$

where $\lambda$ is the wave length, in air, of the light transmitted through the film, N is the index of refraction of the film and $n$ is zero or an integer not greater than 5.

15. The article of claim 14 in which the lamellar layer has incorporated therewith a small amount, not exceeding 20 percent of the weight of the lamellae, of a light-transmitting plastic.

16. An iridescent simulated pearl comprising a bead having a nacreous effect, and superimposed thereon a layer of smooth-surfaced lamellae from the group consisting of natural pearl essence, basic lead carbonate and glass having an index of refraction of at least 1.80 and of the order of one lamella thick, said lamellae being in direct contact with a coating of a light-transmitting film of a thickness of the order of $$(2n+1)\lambda/4N$$

where $\lambda$ is the wave length, in air, of the light transmitted through the film, N is the index of refraction of the film and $n$ is zero or an integer not greater than 5.

17. The simulated pearl of claim 16 in which the lamellar layer is composed of thin plate-like crystals of basic lead carbonate.

References Cited in the file of this patent

UNITED STATES PATENTS

| | | |
|---|---|---|
| 2,302,305 | Farrell | Nov. 17, 1942 |
| 2,712,190 | Sobel | July 5, 1955 |

FOREIGN PATENTS

| | | |
|---|---|---|
| 458,639 | Great Britain | Dec. 23, 1936 |
| 463,589 | Great Britain | Apr. 2, 1937 |

OTHER REFERENCES

"Industrial Finishing," "Pearl Lacquer Finishes on Simulated Pearls," vol. 26, No. 8, June 1950, pages 50–52 and pages 57–60.

"Organic Finishing," "An Abstract of Pearl Essence Technology," pages 41–42, September 1950.

film of high index of refraction glass of the following composition:

| | Percent |
|---|---|
| SiO₂ | 11.7 |
| Na₂O | 1.7 |
| PbO | 86.6 |

After drying iridescence is produced by dipping in a dilute nitrocellulose solution as in Example I.

*Example VI*

A transparent plastic object, such as one made of acrylate ester, is coated with a 16 percent gelatin solution. The dried object is then dipped in a 30 percent dispersion of basic lead carbonate crystals in amyl alcohol. The object is then coated successively with a dilute nitrocellulose lacquer, as in Example I, with the amyl alcohol suspension of basic lead carbonate crystals, and with the ethyl cellulose lacquer of Example III.

*Example VII*

A glass object is dipped into a 15.0 percent suspension of lead hydrogen arsenate crystals (average length 10μ, thickness approximately 20 mμ) in water brought to a pH value of 7.2 with ammonia. (The slightly alkaline medium increases the degree of dispersion of the crystals.) After drying, the object is coated with a dilute nitrocellulose lacquer, as in Example I.

*Example VIII*

A polyester object is dipped into a 7.0 percent suspension of aluminum flake (average length 15μ) in xylol. After drying, the object is coated with a dilute nitrocellulose lacquer, as in Example I, producing a bright iridescence against a silvery background.

These examples are illustrative of the method herein contemplated, but do not encompass all the possibilities included within the scope of this invention. It is important to note, however, that in each of the examples, a reflection interface has been produced by the deposition of high index of refraction lamellae from a suspension in a volatile liquid. The concentration of the lamellae in suspension was so chosen as to achieve the closest approach to a uniform film one lamella thick. However, iridescence is achieved over a wide range of concentrations, those from 1 percent to 60 percent being effective in producing color. At the lower concentrations the high index of refraction layer is incomplete, while at the high concentrations there is a tendency to form layers several lamellae thick. This is not particularly disadvantageous for the first lamella deposition, but is less preferable where a second coating of lamellae is used prior to the application of a protective coat, as in Examples III and VI. In these two instances the concentration of lamellae should be kept to the effective minimum in order to allow the iridescent colors to show through. As mentioned previously, those materials are most suitable which have the smoothest and most regular surfaces, which are well-dispersed in a volatile liquid, which are thin, and which have a high index of refraction.

It should be understood that after the iridescent effect is achieved, the article may be coated with another lamella film and then with a protective lacquer of, for example, ethylcellulose in toluol or xylol. The feature is set forth in Example III.

The application of lamellae from a suspension in a volatile liquid herein contemplated differs from the usual application of pigments or lamellae in a film-forming vehicle: In the latter case the pigment particles remain imbedded in a plastic or resin, the actual pigment concentration of the dried film generally being less than 40 percent. Thus the lamellae do not present the high index of refraction interface required for the production of iridescence. In the present case the addition of a light-transmitting plastic or resinous substance in small concentration to the suspension of lamellae in volatile liquid does not eliminate the effectiveness of the lamellar layer, but tends to diminish it. However, where no outer protective coating is applied to the iridescent layer it may be desirable to use such small amounts of plastics to increase the mechanical strength of the lamellar layer. In any event, the solids content of any added polymer should, therefore, be below 20 percent of the weight of lamellae if the most intense iridescence is to be obtained.

In the foregoing, this invention has been described only in connection with preferred embodiments thereof. Many variations and modifications of the principles of this invention within the scope of the description herein are obvious. Accordingly, it is preferred to be bound not by the specific disclosure herein, but only by the appending claims.

We claim:

1. The method for producing an iridescent effect on an article comprising, applying to said article a dispersion of smooth-surfaced lamellae, having an index of refraction of at least 1.80, in a liquid medium capable of wetting the surface of said lamellae, evaporating said liquid medium, thereby forming on said article a smooth, continuous, lamellar coating, and then directly applying to the said lamellar coating a smooth, continuous film of a transparent material, said film being of a thickness of the order of $$(2n+1)\lambda/4N$$

where $\lambda$ is the wave length, in air, of the light transmitted through the film, N is the index of refraction of the film and $n$ is zero or an integer.

2. The method of claim 1 in which the lamellae are crystals of basic lead carbonate.

3. The method of claim 1 in which the lamellae are natural pearl essence crystals.

4. The method of claim 1 in which the lamellae are glass particles having a high index of refraction.

5. The method for producing an iridescent effect on an article comprising, applying to said article a dispersion of smooth-surfaced lamellae having an index of refraction of at least 1.80 in a liquid medium capable of wetting the surface of said lamellae, evaporating said liquid medium, thereby forming on said article a smooth, continuous lamellar coating and then applying directly to the said lamellar coating a smooth, continuous film of a transparent material, said film being of a thickness of the order of $$(2n+1)\lambda/4N$$

where $\lambda$ is the wave length, in air, of the light transmitted through the film, N is the index of refraction of the film and $n$ is zero or an integer not greater than 5.

6. The method of claim 5 in which the article coated is of a light-transmitting material from the group consisting of glass, polyester and acrylic resins.

7. The method of claim 6 in which the article has previously been coated with a nacreous pigment.

8. The method for producing an iridescent effect on an article comprising the steps of applying to said article a 1 to 60 percent dispersion of smooth surfaced lamellae, having an index of refraction of at least 1.80, in a liquid medium capable of wetting the said lamellae, evaporating said liquid thereby forming on said article a smooth, continuous lamellar coating of the order of one lamella thick, and then applying directly to the said lamellar coating a smooth, continuous film of a transparent polymer deposited from solution in a solvent which is a non-solvent for the material underlying the said lamellar coating, said film being of a thickness of the order of $$(2n+1)\lambda/4N$$

where $\lambda$ is the wave length, in air, of the light transmitted through the film, N is the index of refraction of the film and $n$ is zero or an integer not greater than 5.

9. The method for producing a simulated pearl having an iridescent effect comprising, applying to a nitrocellu-